(12) United States Patent
Viglione

(10) Patent No.: US 10,897,472 B1
(45) Date of Patent: Jan. 19, 2021

(54) IT COMPUTER NETWORK THREAT ANALYSIS, DETECTION AND CONTAINMENT

(71) Applicant: Mark Viglione, Glenmoore, PA (US)

(72) Inventor: Mark Viglione, Glenmoore, PA (US)

(73) Assignee: Enigma Networkz, LLC, Glenmoore, PA (US)

( * ) Notice: Subject to any disclaimer, the term of this patent is extended or adjusted under 35 U.S.C. 154(b) by 208 days.

(21) Appl. No.: 15/993,633

(22) Filed: May 31, 2018

Related U.S. Application Data

(60) Provisional application No. 62/514,370, filed on Jun. 2, 2017.

(51) Int. Cl.
| | | |
|---|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06N 20/00 | (2019.01) |

(52) U.S. Cl.
CPC ...... H04L 63/1416 (2013.01); H04L 63/1491 (2013.01); G06N 20/00 (2019.01)

(58) Field of Classification Search
CPC .. H04L 63/1416; H04L 63/1491; G06N 20/00
See application file for complete search history.

(56) References Cited

U.S. PATENT DOCUMENTS

| | | | |
|---|---|---|---|
| 10,225,284 B1 * | 3/2019 | Evans | H04L 63/0209 |
| 10,291,638 B1 * | 5/2019 | Chandana | G06F 7/24 |
| 2002/0194489 A1 * | 12/2002 | Almogy | H04L 63/1491 726/24 |
| 2003/0154399 A1 * | 8/2003 | Zuk | H04L 63/1416 726/11 |
| 2005/0050338 A1 * | 3/2005 | Liang | H04L 63/0218 713/188 |
| 2006/0117385 A1 * | 6/2006 | Mester | H04L 51/12 726/22 |
| 2008/0141374 A1 * | 6/2008 | Sidiroglou | G06F 21/554 726/23 |
| 2009/0271504 A1 * | 10/2009 | Ginter | H04L 41/0806 709/220 |
| 2012/0005756 A1 * | 1/2012 | Hoefelmeyer | H04L 63/1425 726/24 |
| 2015/0033341 A1 * | 1/2015 | Schmidtler | H04L 63/1425 726/23 |
| 2015/0319185 A1 * | 11/2015 | Kirti | H04L 63/1416 726/23 |
| 2017/0026391 A1 * | 1/2017 | Abu-Nimeh | G06F 16/285 |
| 2017/0214702 A1 * | 7/2017 | Moscovici | H04L 63/1416 |
| 2017/0214708 A1 * | 7/2017 | Gukal | H04L 63/1433 |
| 2018/0157831 A1 * | 6/2018 | Abbaszadeh | G06F 21/552 |

* cited by examiner

*Primary Examiner* — Trong H Nguyen

(74) *Attorney, Agent, or Firm* — Joseph E. Maenner; Maenner & Associates, LLC

(57) ABSTRACT

A software threat analysis, detection and containment system includes a data aggregation model that receives and aggregates data from a plurality of sources in a computer network, a classification engine that classifies the aggregated data, and a plurality of data sets into which the classified data is stored. A model creation engine creates threat models based on the content of each data set and a prediction and analysis engine generates actionable information and predictions based on the content of each threat model.

13 Claims, 5 Drawing Sheets

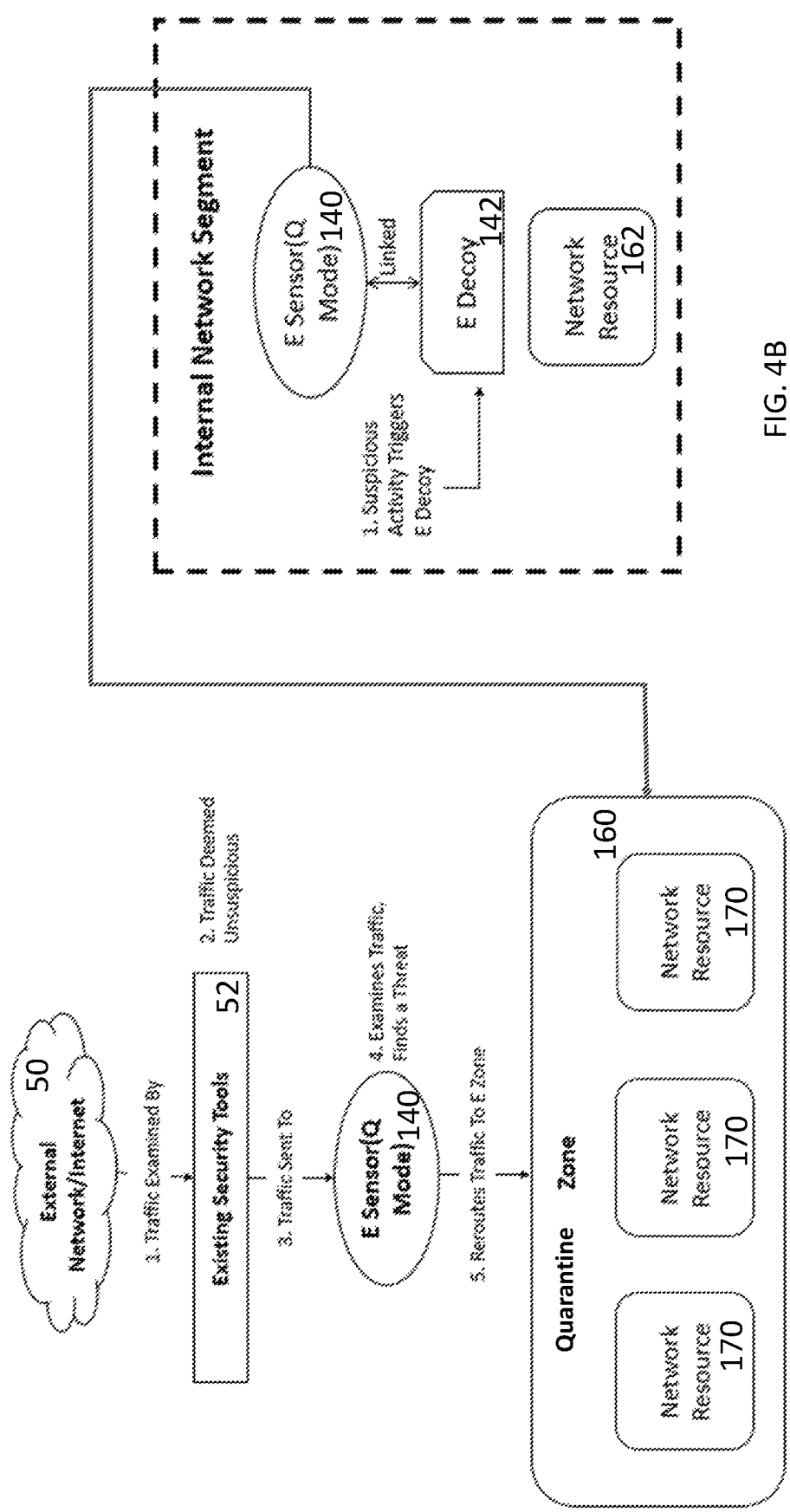

IT COMPUTER NETWORK THREAT ANALYSIS, DETECTION AND CONTAINMENT

CROSS-REFERENCE TO RELATED APPLICATION

The present invention claims priority from U.S. Provisional Patent Application Ser. No. 62/514,370, filed on Jun. 2, 2017, which is incorporated herein by reference in its entirety.

BACKGROUND OF THE INVENTION

Field of the Invention

The present invention relates to a system and method for analyzing and detecting potential threats against an internal IT computer network and developing a decoy system to contain and remediate the threats.

Description of the Related Art

Threat actors are coming up with new and sophisticated ways to breach networks and steal sensitive data every day. Cybercrime against organizations and individuals is increasing substantially, leaving said entities with the need for solutions to combat the threat of new and emerging acts of cybercrime. Security solutions, methods and processes need to be constantly evolving in order to account for new attack methods and vectors. Current market solutions attempt to solve niche problems within the realm of cybersecurity and tend to lack a holistic approach. In order for entities to respond, adapt and defend against new and emerging cybercrime trends, solutions are needed that are constantly analyzing and interpreting new data that can be used to find relevant information specific to the entities environment. By identifying actionable information relevant to specific IT environments, solutions can provide a more granular, custom, approach to preventing cybercrime against organizations and individuals.

BRIEF SUMMARY OF THE INVENTION

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present invention is a method for collecting, analyzing, and interpreting data in order to find trends, patterns and actionable information. The derived information can be used to construct systems providing network protection against external and internal threats.

One embodiment of the invention includes methods for collecting structured and unstructured data in order to transform said data into actionable information. Actionable information encompasses data sources that have been aggregated, correlated, and analyzed in order to find trends and patterns in data relevant to the security needs of an organization or individual. Another embodiment of the invention relates predominantly to the generation of systems providing computer network and data security. Through machine learning, data from relevant sources will be analyzed in order to construct custom network security systems specific to the environment said systems are deployed in. These systems will aid in deceiving malicious entities attempting to breach a computer network and cause harm to an organization, as well as provide actionable information that system components and other existing network infrastructure can leverage to better secure the network.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 4A illustrates incoming traffic from an external network source, moving through existing perimeter security tools and measures, then being inspected by an external sensor in Q Mode for suspicious activity, wherein sensors identify a threat in the traffic and reroute the traffic to a quarantine zone;

FIG. 4B provides an example of an Internal sensor in Q Mode rerouting suspicious activity on a decoy into a designated quarantine zone.

DETAILED DESCRIPTION

Figure 1:
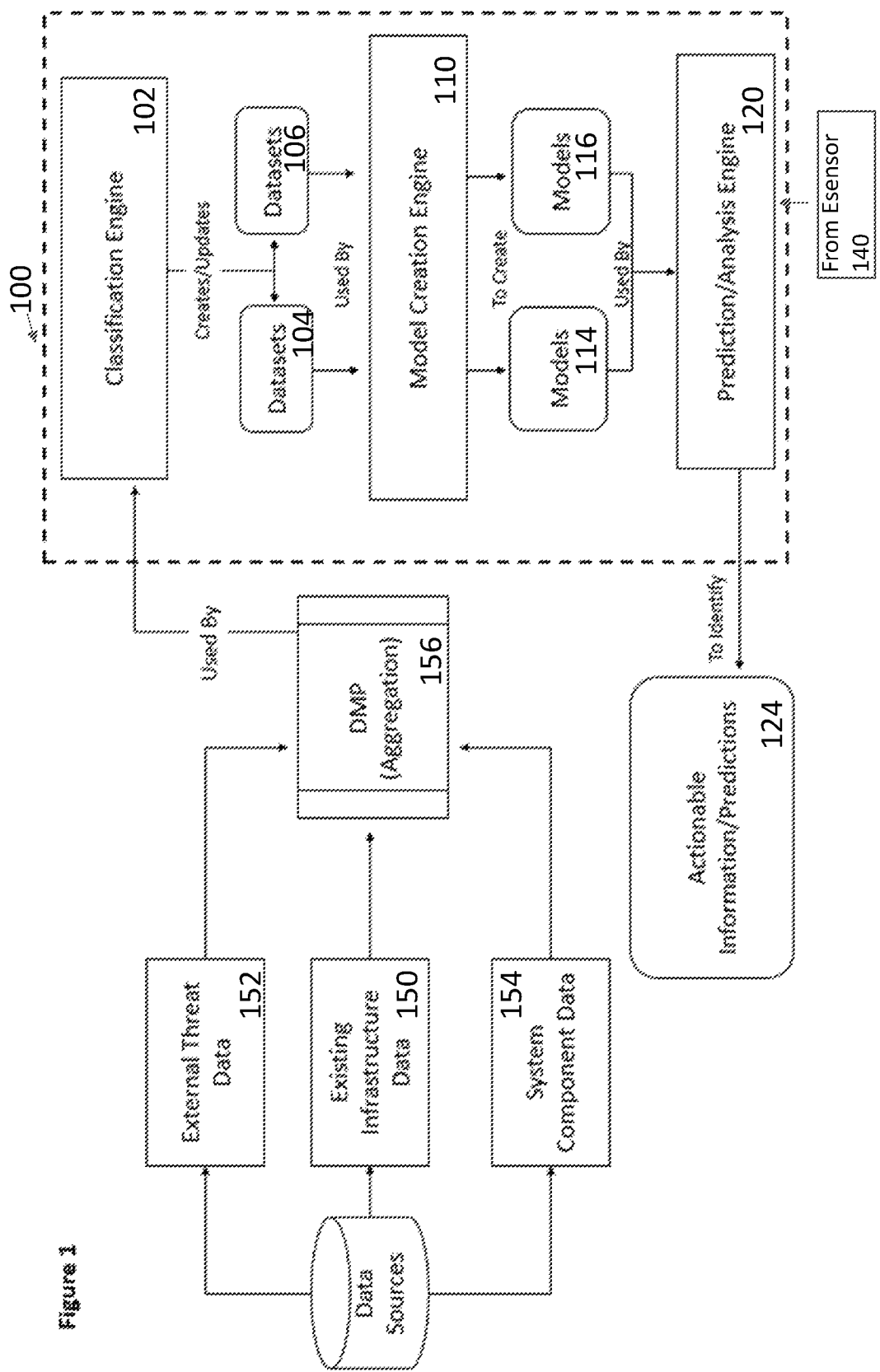
FIG. 1 is a sample illustration of how multiple types of data sources are collected, aggregated in a data management platform, and used by the multiple machine learning application engines to produce actionable information.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary"

is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a security system for a computer network that is connected to an external source, such as the internet 50 (shown in FIG. 4A). Even if existing security tools 52 are provided that are intended to block external security threats from entering and disrupting or disabling the network, many times malicious traffic can pass through security tools 52 and enter the network.

The present invention provides a system that analyzes data in order to give organizations a better understanding of their network security environment, and uses that data to find threats (threats include but are not limited to malicious software and threat actors) in the computer network the system is deployed in and reroute said threats to a quarantine zone so that the threats cannot act upon the computer network.

A first exemplary embodiment of a system 100 according to the present invention collects, aggregates, and classifies data from multiple sources. Once system 100 is deployed in an environment such as a computer network, system 100 collects data from multiple sources including, but not limited to, internal existing infrastructure within an organization 150, relevant external sources 152, and deployed system components 154.

Data collected from sources 150-154 can be in the form of structured, unstructured, or semi structured data. After collection, the data is aggregated in a data management platform 156 and then analyzed by system 100 in order to find common traits relevant to the environment in which system 100 is deployed. These common traits (features) found within the data sources 150-154 can be used for classifying unstructured and semi structured data in a classification engine 102 during present and future collection cycles.

Once data is classified, the data can be used to create and or update custom environment datasets 104, 106. While two datasets 104, 106 are shown, those skilled in the art will recognize that more or less than two datasets 104, 106 can be generated.

Custom datasets 104, 106 can contain data including, but not limited to, known threat attributes, suspicious traffic patterns, network behavior patterns, existing infrastructure data, and system component data. These datasets 104, 106 are used by a model creation engine 110 that identifies actionable information. Custom datasets 104, 106, generated during the process described above, are used to create models 114, 116, 118 (only models 114, 116 are shown in FIG. 1).

Figure 2:
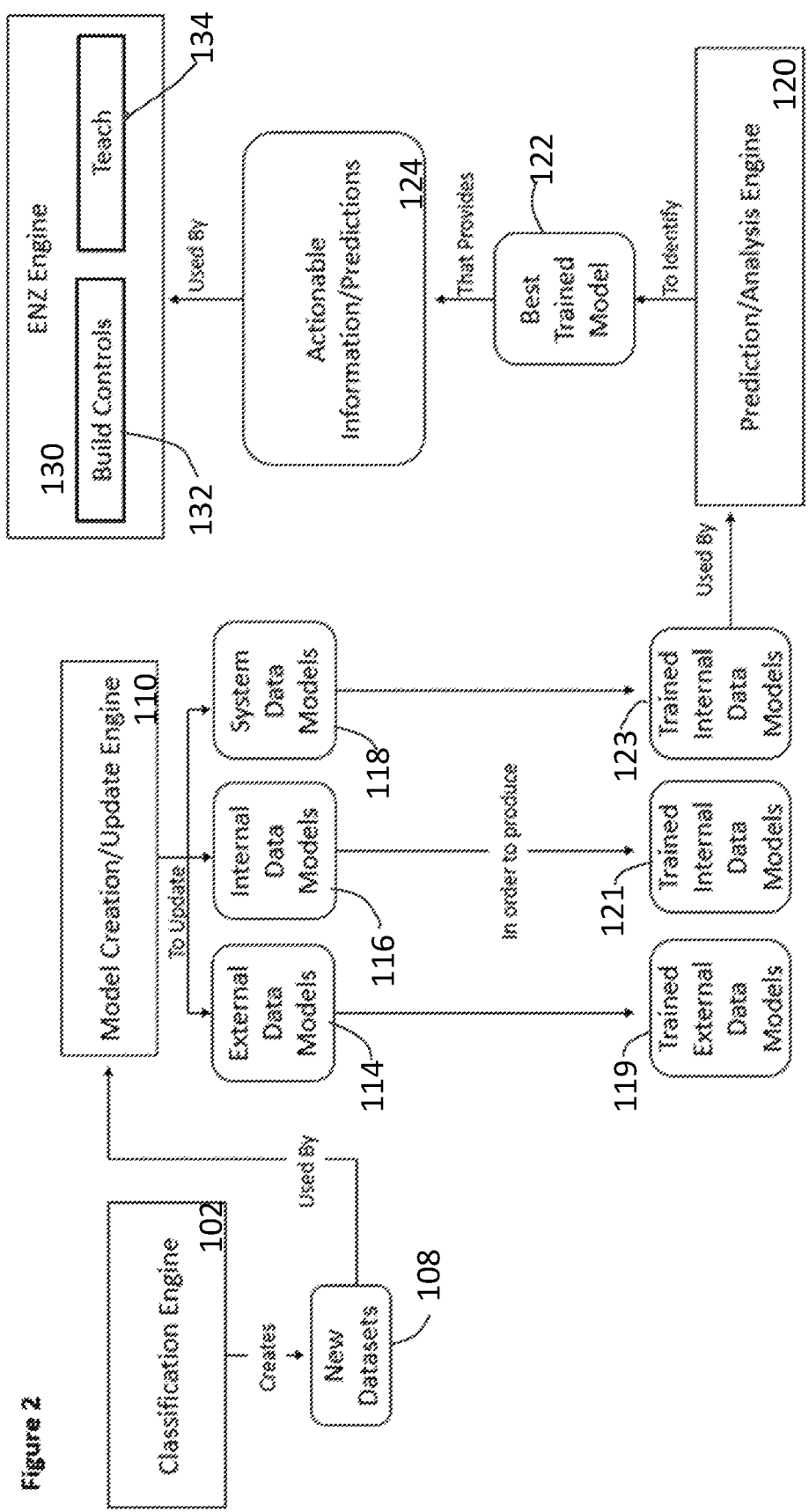
FIG. 2 illustrates how new data will be utilized by the multiple machine learning application engines in order to identify new actionable information that will be used by a back-end logic creation engine to build recommended controls and teach other components.

The model creation engine 110 uses the customized datasets 104, 106 to build environment specific models 114, 116, 118. As shown in FIG. 2, the models can include external data models 114, internal data models 116, and system data models 118. The models 114, 116, 118 are utilized by a prediction and analysis engine 120 to identity actionable information among data and datasets. Models 114, 116, 118 use new data 108 obtained by system 100 during operation of system 100 to obtain the most up to date, current models (metrics) that will be used by the system 100 when identifying threats, predicting future events, and general data analysis. New datasets 108 are used to "train" models 114, 116, 118, resulting in updated "trained models" 119, 121, 123.

Prediction and analysis engine 120 uses the trained models 119, 121, 123 derived by the model creation/update engine to identify the best model 122 to use when generating actionable information and predictions 124. The derived actionable information and predictions 124 are sent to a back-end logic creation engine 130 that is used to power the front-end user interface. Engine 130 manages and holds all relevant data derived from all the previous steps and allows users to interact with the data within their system in order to build dashboards, and query said data to produce insights. Engine 130 is used to build recommendation controls 132 as well as to teach existing infrastructure and system components, shown in block 134. Once system 100 identifies data that can be used to gain insights as well as identify and predict threats, that information (logic) can used by other existing infrastructure APIs (firewall, antivirus, IDS, SIEM, sensors, decoys, quarantine zones) in order to teach these tools to account for new threats not previously detected. New models are built and existing models are updated regularly as new traits and patterns in data are found that could lead to actionable information. Actionable information includes, but is not limited to, common network patterns and trends, suspicious network patterns and trends, potential threat sources, known malicious threats, known malicious signatures and behavior patterns, network topology, system component data and deviations, and relevant external source data.

Actionable information, as it pertains to the environment in which system 100 is deployed, is used by engine 130 and the prediction and analysis engine 120 to learn the overall flow and norms of the environment. Through this information, the analysis engine 120 is able to identify new threats as well as existing threats that have not been remedied, predict future threats against the environment, provide recommendation controls to the organization, and teach existing infrastructure and system components to account and prepare for newly identified threats. Engine 130 takes actionable information and predictions 124 and generates logic that can be used by an organization's security teams, existing tools, and other components, such as E sensors 140, shown in FIGS. 3A-4A.

This logic can include, but is not limited to, baseline security environment metrics, malicious signatures and threat patterns, newly discovered attack methods and vectors, newly discovered attack predictions, rule sets that identify known threats and potentially identify unknown threats, network behavior patterns for baseline topology standards creation, current network topology weaknesses, and relevant existing system vulnerabilities.

The logic, which can be derived as discussed above, is used by system components and existing environment infrastructure. Existing environment infrastructure can include, but is not limited to, existing security tools (such as existing security tools 52), existing network tools, security teams and individuals, as well as security procedures and process documentation. Components such as sensors 140 aid in safeguarding an environment by protecting the network against internal and external threats.

Sensors 140, using the logic derived as described above, monitor and report on suspicious network traffic. Through the use of existing, or system deployed network taps and spans, sensors 140 receive a mirrored copy of network traffic in order to identify suspicious activity. Sensors 140 can be deployed in the internal environment as well as along the network edge. Through monitoring network segments traffic, sensors 140 will establish a baseline for what is considered normal activity within the environment network segment in which they are deployed in. Using the logic described above, sensors 140 identify suspicious and potentially malicious activity and relay such activity to the DMP 156 to be used by system 100 for analysis. Sensors 140 have multiple functions and modes, designated Q mode and H mode, that vary depending on where in the network sensors 140 are deployed and what mode they are set to when deployed.

Figure 3B:
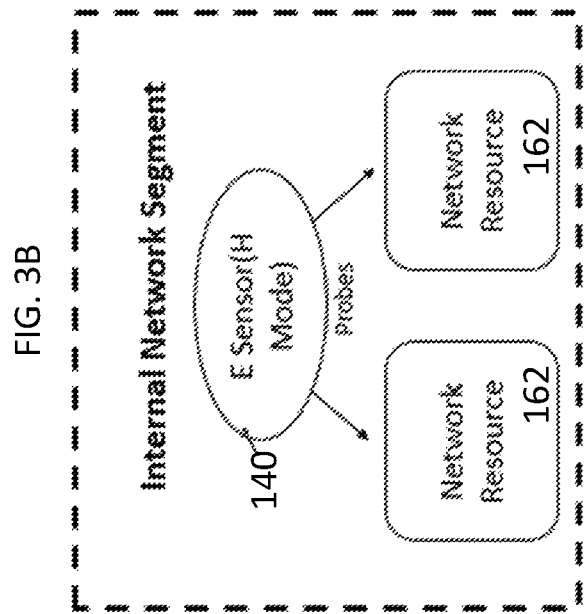
FIG. 3B shows a sensor in H Mode probing a network segment.
Figure 3A:
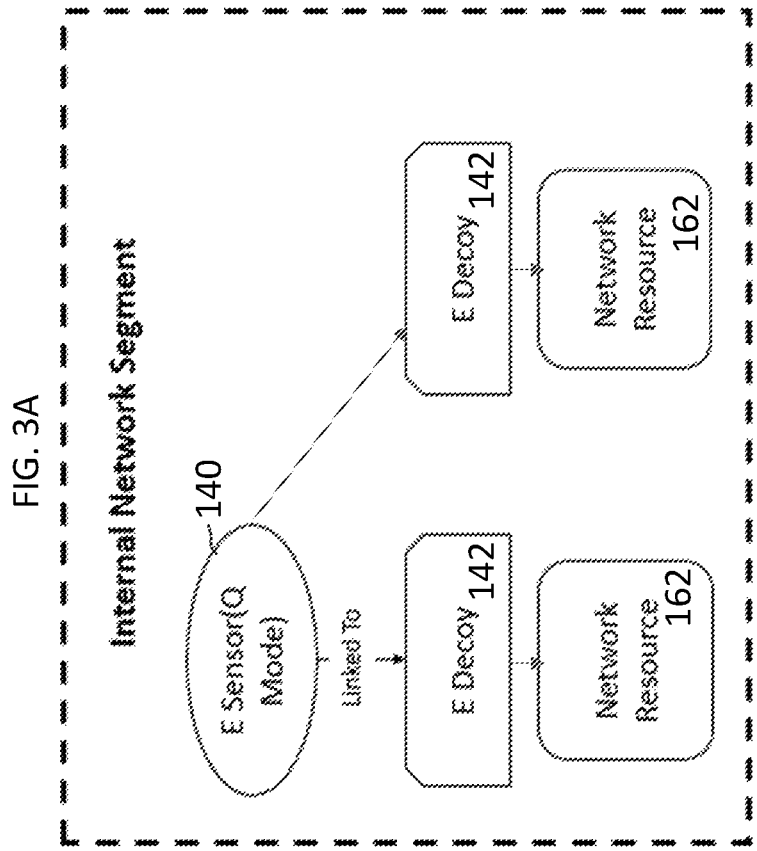
FIG. 3A shows decoys and a sensor configured to protect network resources, deceive threat actors and contain threats.

As shown in FIG. 3A, sensors 140 in Q mode monitor network traffic and act as a filter, attempting to reroute malicious traffic into a quarantine zone 160. Q mode sensors 140 are deployed within internal network segments and linked to decoys 142 (shown in FIG. 4B), as well as on the edge of the network (before, after or on the firewall). One function of a sensor 140 in Q mode is to monitor traffic, identify malicious or suspicious traffic, and reroute such traffic into a quarantine zone 160.

Referring to FIG. 3B, sensors 140 in H mode actively probe network segments, monitoring traffic patterns and hunting for new potential threats. When in H mode, sensors 140 are assigned a specific path to follow while probing the environment and looking for anomalies. Sensors 140 in H mode cannot take action like sensors 140 in Q mode can to quarantine threats. An exemplary function of sensors 140 in H mode is to scout, monitor and capture new network traffic patterns to relay to the DMP 156 and be used by system 100. However, all E sensors 140 (both Q mode and H mode) are linked together. If a sensor 140 in Q mode is under attack or having trouble filtering traffic, sensors 140 in H mode can break their probing cycle and assist. Because all sensors 140 are linked via the internal network, a threshold for how much traffic each sensor 140 can handle can be set internally. If a threshold is met or exceeded, this is interpreted as sensor 140 in Q mode being under distress. As a result, system 100 can convert a sensor 140 in H mode to a sensor 140 in Q mode to take up the excess load above the threshold amount.

Decoys 142 deal with methods for luring and deceiving threat actors that are already inside a segment of the internal network. The objective is to lure such threat actors away from actual network resources and onto a sandboxed quarantine environment. Such methods are used by decoys 142 in order to identify, respond and contain such threats. Decoys 142 are applications that are deployed within segments of an internal network and are designed to simulate real network endpoints in order to deceive threat actors into interacting with a decoy instead of an actual resource. Decoys 142 are able to be adapt to the organization's IT environment in which the system 100 is deployed. This adaptation is accomplished by using the actionable information 124 derived from system 100, and are designed to reflect the types of systems and services contained within such environment.

Once deployed, decoys 142 remain invisible to legitimate users on a network; only individuals attempting some form of abnormal or suspicious activity would interact with decoys 142. Such activity can include but is not limited to: irregular port or network scanning; connection requests to an unknown or suspicious website, service or server; abnormal download attempts and frequencies; an overwhelming amount of connection requests; and various activity linked to stages within the cyber kill chain. Sensors 140 in Q Mode are assigned to specific decoys 142. When a threat actor attempts to connect, or attack, a decoy 142, its assigned sensor 140 acts as a filter and reroutes the traffic into a deception network, such as quarantine zone 160.

Another component of system 100 relates to the design and use of the deception network to thwart cybercrime by baffling and disorienting threat actors looking to breach a network and steal data. The deception network, zone 160, shown in FIG. 4A, is defined as a virtual local area network that is designed to simulate the actual environment in which system 100 is deployed. Methods for collecting the information necessary for designing such networks can include, but are not limited to, network mapping, network discovery, or network enumerating processes.

External and Internal sensors 140 set to Q mode reroute external traffic deemed malicious, as well as internal traffic caught by decoys 142, to "dummy" network resources 170 in specific quarantine zones 160. Multiple designated quarantine zones 160 are set up to quarantine and study specific traffic caught within the zones. Virtual machines and containers within quarantine zones 160 simulate actual environment endpoints and services, similar to the design and build of decoys 142. Quarantine zones 160 provide protection for the internal network by, confusing and disorienting threat actors attempting to breach a network and steal data, quarantining identified malicious activity to a virtual local area network, and tricking threat actors trapped within said network into attacking false resources and obtaining useless data.

Figure 5:
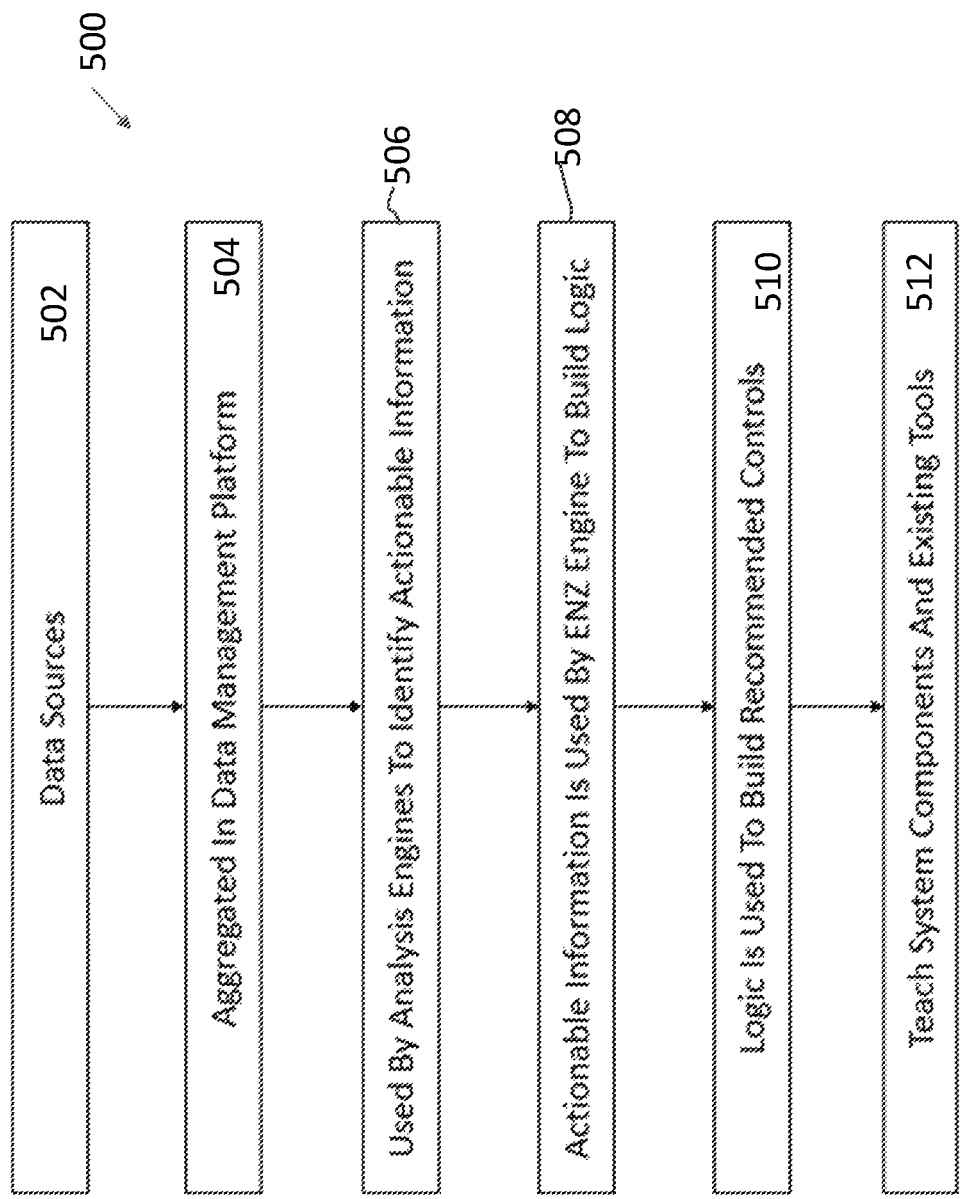
FIG. 5 describes the various stages data goes through from the time that the data is collected to the time that the data is used to create logic, build recommended controls, and teach system components and existing infrastructure.

FIG. 5 is an exemplary flowchart 500 that describes the various stages that data goes through from the time that the data is collected to the time that the data is used to create logic, build recommended controls, and teach system components and existing infrastructure. In step 502, data sources are mined and forwarded to a data management platform 156 for aggregation in step 504. In step 506, the aggregated data is used by the various engines within system 100 to identify actionable information 124.

In step 508, the actionable information 124 is used by engine 130 to build logic that is used in step 510 to build recommended controls and settings for organizations to use when accessing the data and functionalities within system 100. In step 512, the actionable information 124 is used by other existing infrastructure APIs (firewall, antivirus, IDS, SIEM, sensors 140, decoys 142, quarantine zones 160) in order to teach these tools to account for new threats not previously detected.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A software threat analysis, detection and containment system comprising:
    a data aggregation model configured to receive and aggregate data from a plurality of sources in a computer network;
    a classification engine configured to classify the aggregated data;
    a plurality of data sets wherein the classified data is stored;
    a model creation engine configured to generate threat models based on content of each of the plurality of data sets;
    a prediction and analysis engine configured to generate actionable information and predictions based on content of each of the threat models;
    a first plurality of sensors embedded in the computer network, the first plurality of sensors being configured to monitor and report suspicious traffic in the computer network;
    a second plurality of sensors embedded in the computer network, the second plurality of sensors being adapted to scout, monitor and capture new network traffic patterns in a computer network, wherein at least some of the second plurality of sensors are convertible into additional of the first plurality of sensors when an amount of suspicious traffic exceeds a threshold for the first plurality of sensors; and
    a software decoy configured to lure the suspicious traffic from within the computer network to an isolated deception network, the isolated deception network being configured to trap the suspicious traffic.

2. The software threat analysis, detection and containment system according to claim 1, further comprising an engine configured to take the actionable information and the predictions from the prediction and analysis engine and create logic that is used, searched and understood by entities in an environment wherein the system is deployed.

3. The software threat analysis, detection and containment system according to claim 1, wherein at least one of the plurality of data sets contains at least one of known threat attributes, suspicious traffic patterns, network behavior patterns, existing infrastructure data, and system component data.

4. The software threat analysis, detection and containment system according to claim 3, wherein at least one of the plurality of data sets contains each of known threat attributes, suspicious traffic patterns, network behavior patterns, existing infrastructure data, and system component data.

5. The software threat analysis, detection and containment system according to claim 1, wherein the predictions are configured to build controls and to teach infrastructure and system components.

6. The software threat analysis, detection and containment system according to claim 1, wherein the software decoy comprises an application configured to simulate real network endpoints.

7. The software threat analysis, detection and containment system according to claim 1, further comprising:
    a deception quarantine network configured to trap threats and to provide an isolated location for the threats to execute.

8. The software threat analysis, detection and containment system according to claim 7, wherein the deception quarantine network provides useless data to the threats.

9. The software threat analysis, detection and containment system according to claim 1, comprising a plurality of decoys, wherein each of the first plurality of sensors is assigned to one of the plurality of decoys.

10. The software threat analysis, detection and containment system according to claim 1, wherein the first plurality of sensors is configured to monitor traffic, identify malicious or suspicious traffic, and reroute the identified malicious or suspicious traffic into a quarantine zone, and wherein the second plurality of sensors is configured to scout, monitor and capture new network traffic patterns to relay to a data management platform.

11. A method of identifying and isolating a threat to a network system comprising the steps of:
    (a) examining incoming traffic;
    (b) transmitting the incoming traffic to a first type of sensor, the first type of sensor being configured to identify and redirecting threats to a quarantine area;
    (c) identifying a threat in the incoming traffic with the first type of sensor;
    (d) redirecting the identified threat with the first type of sensor to the quarantine area configured to trap the identified threat;
    (e) using a second type of sensor, different from the first type of sensor, the second type of sensor configured to actively probe network segments, monitor traffic patterns, and hunt for potential threats to the network system; and
    (f) in response to determining that the first type of sensor is overwhelmed by the identified threat, converting the second type of sensor into an additional of the first type of sensor.

12. The method according to claim 11, further comprising the step of:
    (g) simulating actual environment endpoints.

13. The method according to claim 12, further comprising the step of:
    (h) tricking the identified threat to attack false resources in the simulated endpoints.

* * * * *